United States Patent [19]

Hasselbeck et al.

[11] 3,972,299
[45] Aug. 3, 1976

[54] CAN BODY TRIMMER

[75] Inventors: Richard J. Hasselbeck, Houston; Kurt H. Wills, Sidney, both of Ohio

[73] Assignee: The Stolle Corporation, Sidney, Ohio

[22] Filed: Jan. 31, 1975

[21] Appl. No.: 546,135

[52] U.S. Cl. .............................. 113/7 R; 72/334; 83/54
[51] Int. Cl.² ................. B21D 51/38; B21D 51/10; B26D 1/56
[58] Field of Search ................ 113/7 R, 7 A, 1 G; 72/334; 83/191, 193, 194, 54

[56] References Cited
UNITED STATES PATENTS

| | | | |
|---|---|---|---|
| 2,074,547 | 3/1937 | Hessenbruch | 83/193 |
| 3,130,698 | 4/1964 | Knowles | 113/7 R |
| 3,581,691 | 6/1971 | Ringler | 113/1 G |
| 3,702,559 | 11/1972 | Hasselbeck | 72/345 |
| 3,797,429 | 3/1974 | Wolfe | 113/7 R |
| 3,838,653 | 10/1974 | Larkin | 113/7 R |

*Primary Examiner*—Leon Gilden
*Attorney, Agent, or Firm*—Melville, Strasser, Foster & Hoffman

[57] ABSTRACT

The application discloses a can body trimmer which may be a free standing unit usable along with existing can body making machines, or which may be combined with a can body making machine as an integral part thereof. The apparatus trims the excess metal from the open end of a can body without leaving burrs, at a high rate of speed, and provides a can body trimmed to a precise side wall length for subsequent finishing operations including flanging, or necking and flanging to facilitate installation of the end closing lid after the can has been filled.

8 Claims, 6 Drawing Figures

CAN BODY TRIMMER

BRIEF SUMMARY OF THE INVENTION

In the manufacture of can bodies it has come to be that the bulk of cans are manufactured as two-piece cans. One piece includes the cylindrical side wall and one end, and this piece is manufactured as an integral unit. The second end is then applied later after the can has been filled.

Generally the can body comprising the side wall and the integral end is produced by means of conventional cup drawing techniques which may be followed by wall-ironing operations to reduce wall thickness and increase body length. The can body resulting from this technique has an irregular and variable length as a result of non-uniform metal properties, variations in metal gauge, and variations in tool geometry related to wear and manufacturing tolerances.

The trimmer of the present invention trims the excess metal from the open end of a can body without leaving burrs and does so at a high rate of speed (several hundred per minute) and thus produces a can body trimmed to a precise side wall length for subsequent finishing operations which will include flanging, or necking and flanging to facilitate installation of the end closing lid at a later date.

The trimmer disclosed herein may be a free standing unit which may be installed in a conventional can making line. It may be provided in the form of a "2-out" machine, i.e. it provides two trimming mandrels arranged about a central drive unit and thus doubles the production rate. Each of the two infeed chutes may be connected to one or more body making machines and the output may be combined for delivery to subsequent cleaning and finishing operations.

In the Hasselbeck et al. U.S. Pat. No. 3,702,559, issued Nov. 14, 1972, there is disclosed a can body making machine in which a previously formed cup is wall-ironed, domed and then trimmed. A wall-ironing punch and a stripper punch are operated by a barrel can mechanism, and the wall-ironing punch cooperates with the doming die to perform the doming operation. The trimmer is stated to be conventional in all respects.

Since the issuance of the said Hasselbeck patent, two can body making machines have been arranged side-by-side with the respective punches operated from the same set of barrel cams, but 180° apart, so that while one of the machines is redrawing, ironing, base forming, and trimming, the other machine is retracting to receive another cup. This improved machine is commonly referred to as a 2-out machine and of course it doubles the production rate.

Two trimming mandrels according to the present invention may be provided with a common drive so that the entire combined machine is a 2-out machine. With the 2-out trimmer coupled directly to a 2-out body making machine, the loading star wheels of the trimmer receive the can bodies directly from the ironing and doming punches of the body maker, and deliver them under positive control directly to the trimming mandrels, whereby difficulties encountered in handling untrimmed cans at random in conventional track work are avoided.

BRIEF DESCRIPTION OF THE SEVERAL VIEWS OF THE DRAWING

FIG. 3 is a detailed cross sectional view of the scrap parting tool and dies on an enlarged scale taken on the line 3—3 of FIG. 2.

DETAILED DESCRIPTION

Figure 4:
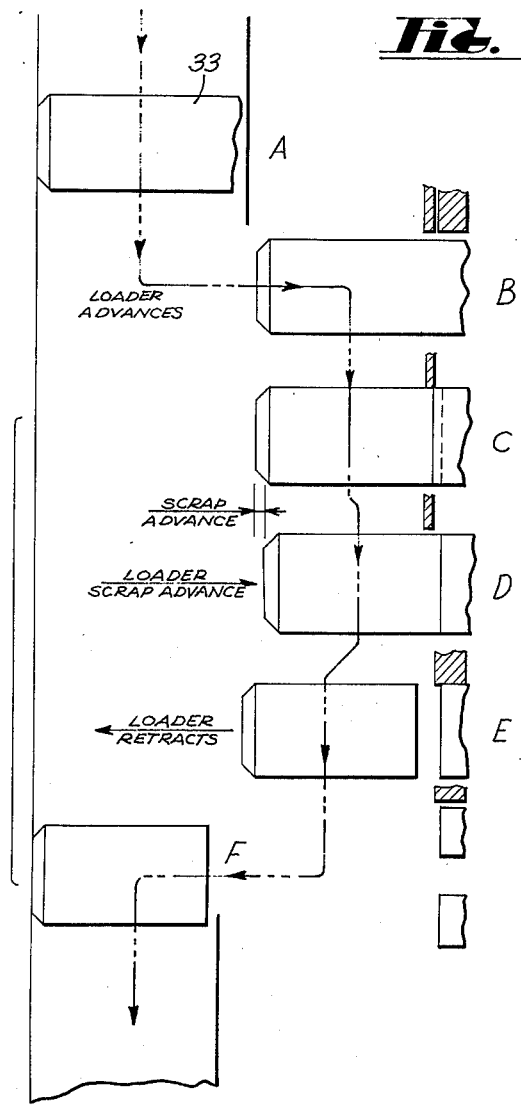
FIG. 4 is a diagram showing the sequence of operations of the trimmer.

An understanding of the apparatus of the present invention will be facilitated by a study of FIG. 4 which shows the sequence of operations. At position A, a can is being fed by means of a star wheel or other type of conveyor into position for loading onto the trimming mandrel. At position B, the loader advances, as will be described in more detail hereinafter, and pushes the can to be trimmed onto the trimming mandrel in position for the trimming knives to operated upon it. At position C, the trimming knife cuts the ragged end of the can to the proper length. At position D, the loader further advances the can a slight amount and at position E, the parting dies cut the scrap so that it may be removed by a suitable vacuum system or the like. At position F, the loader plunger has retracted and the can is ejected into a compartmented belt, star wheel, or other conveying means.

Figure 1:
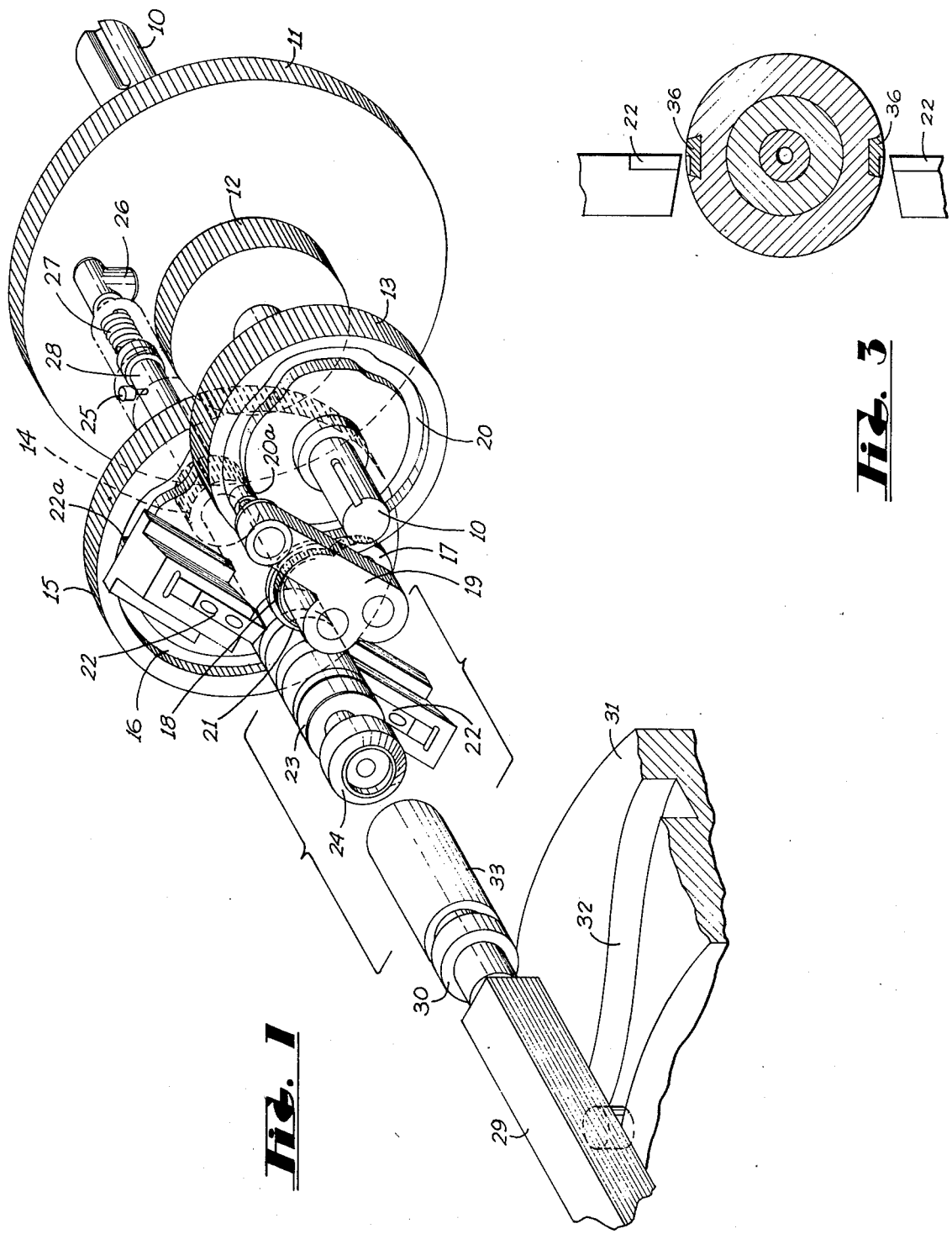
FIG. 1 is a general fragmentary perspective view of a trimmer according to the present invention.

Turning now to FIG. 1, the main drive shaft is indicated at 10. On this shaft is a gear 11, a small gear 12, and another gear 13. The gear 11 drives the small gear 14 which rotates the trimming mandrel.

The gear 12 drives the gear 15 which carries the cam 16 to operate the scrap cutting or parting tool.

The gear 13 drives the gear 17 which in turn meshes with the gear 18, both of which are mounted on a bell crank 19. The gear 13 has the cam track 20 which is engaged by the follower 20a on the bell crank 19. The gear 18 drives the exterior cutting tool 21.

The scrap cutting or parting tools are indicated at 22 and it will be noted that there are two of these diametrically opposite each other. Both of them have followers 22a which engage the track of the cam 16 at diametrically opposite points. The gear ratios are such that the gear 15 and thus the cam track are rotated at half the speed of the machine.

The trimming mandrel is indicated at 23 and it has a locater element 24 associated therewith. The mandrel 23 will be described in more detail hereinafter. A rotary air connection is somewhat diagrammatically indicated at 25 and another rotary air connection is indicated at 26. A compression spring 27 is provided on the shaft 28, the purpose of which will be described in more detail hereinafter.

In alignment with the shaft 28 there is provided a loading plunger 29 carrying a freely turning nose 30. The plunger 29 is actuated by a cam 31 having a track 32. The plunger 29 serves to push a can body 33 onto the trimming mandrel 23 as will be described in more detail hereinafter.

Figure 2:
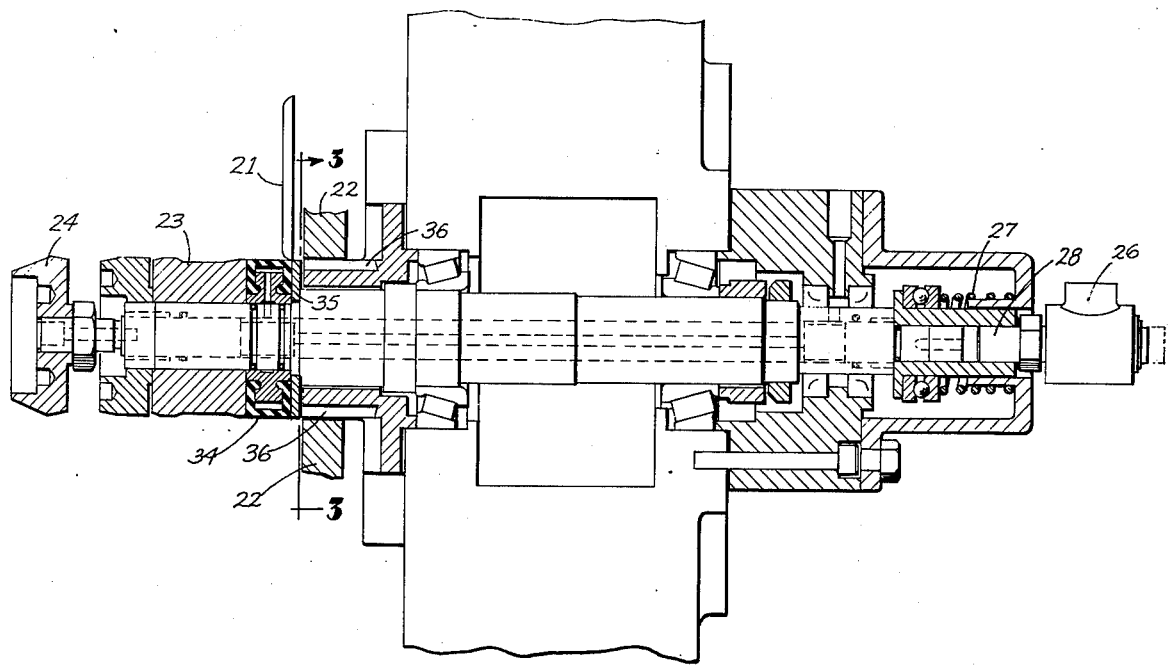
FIG. 2 is a detailed cross sectional view of the trimming mandrel.

Referring now to FIG. 2, the trimming mandrel is again shown at 23 and the locater element at 24. As will be clear from a consideration of FIG. 2, the locater element 24 is adjustable so as to take care of different lengths of trim. The plunger 29 through its nose 30 pushes the can onto the mandrel 23 and the nose 24 determines the correct position of the can on the mandrel. The mandrel is provided with a pneumatic clutch indicated generally at 34 and this clutch of course expands to grip the can and hold it in position on the mandrel. The mandrel also is provided with the interior cutting blade 35. This blade of course rotates with the mandrel, and as pointed out above the exterior blade 21 is rotated through the gearing 17, 18 and 13, and it is driven so that the external cutter rotates at the same peripheral speed as the mandrel.

It will now be clear that an untrimmed can body 33 is delivered by any suitable means such as an indexing compartmented belt or a star wheel into a position in axial alignment with the mandrel 23. The cam 31 then drives the loading plunger 29 forward during a dwell period of the can feeding apparatus. The freely turning nose 30 contacts the can end and pushes the can completely onto the mandrel and into contact with the interior rotating locater 24. The can is then positioned on the mandrel such that the interior cutting blade 35 and the external cutting wheel 21 will trim the can to the desired length.

The internal pneumatic clutch 34 then expands and firmly engages the can body and causes it to turn with the mandrel 23, the locater 24, and the interior cutting blade 35. As pointed out above, the exterior cutting wheel 21 is rotated in synchronous speed with the mandrel 23 so that no relative motion occurs between the can body and the exterior cutting wheel. The cutting wheel 21 is brought into engagement with the can by the cam 20 and all of this of course operates in timed relation.

When the scrap has been cut by the cooperation of the exterior cutting wheel 21 and the interior cutting blade 35, the bell crank 19 causes the exterior cutting wheel 21 to move outward away from the can body until it is free of the can body and the band of trim scrap.

At this point, the air pressure within the pneumatic clutch is released and the cam 31 causes the plunger and nose 29 and 30 to push the trimmed can body further onto the trimming mandrel. The scrap band is pushed forward by the can body until it is completely clear of the interior cutting blade 35 and in position on the parting dies 36.

In the process of moving the can body back on the mandrel, the loader has pressed the interior locater 24 back toward the cutting blade 35 and by means of the central shaft 28 has compressed the spring 27.

At this stage, the barrel cam 31 causes the loader plunger 29 and nose 30 to withdraw from contact with the trimming mandrel and return to their initial position clear of the feeder arrangement, whether it be a star wheel or compartmented belt or the like.

The energy stored in the compressed ring as above outlined now causes the can to be ejected forcibly from the area of the interior cutting blade and at this point air is introduced into the can by means of the rotary connection 26 whereby the can is caused to follow the loader nose 30 out to its initial position where the can is again trapped in the conveying device.

At this point, the gear driven cam 16 causes the two parting blades 22 to move inward. These blades operate in conjunction with the stationary dies 36 and serve to cut the scrap ring into two pieces which are then removed by a suitable vacuum system.

The conveying means then indexes forward one position and delivers another untrimmed can to the trimming mandrel and the above cycle is repeated.

Figure 5:
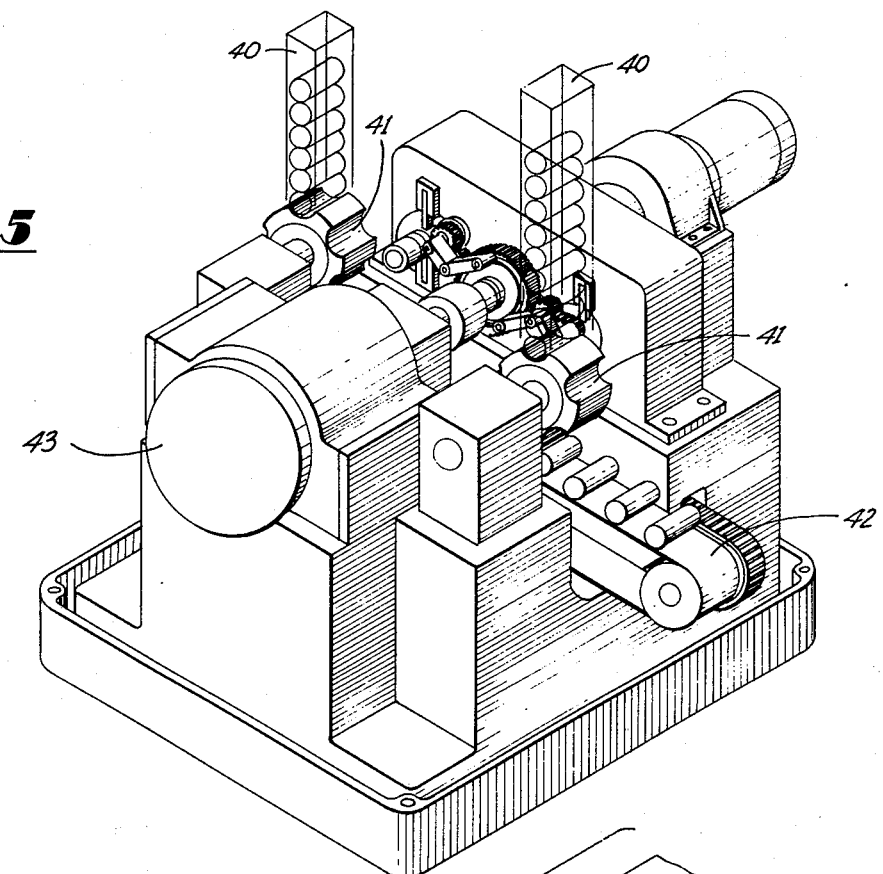
FIG. 5 is a perspective view of the trimmer in the form of a 2-out trimmer according to the invention as a free standing machine.

In FIG. 5, the basic machine thus far described is shown as a free standing machine as it could be installed in a conventional can making line. The machine shown in FIG. 5 is a 2-out machine which means that it contains two trimming mandrels arranged about a central drive unit whereby to double the production rate. The infield chutes 40 which feed the star wheels 41 could be connected to one or more body making machines and the output could be combined as indicated by the conveyor 42 for delivery of trimmed cans to subsequent cleaning and finishing operations. The two trimmers are operated from a common drive generally indicated at 43.

Figure 6:
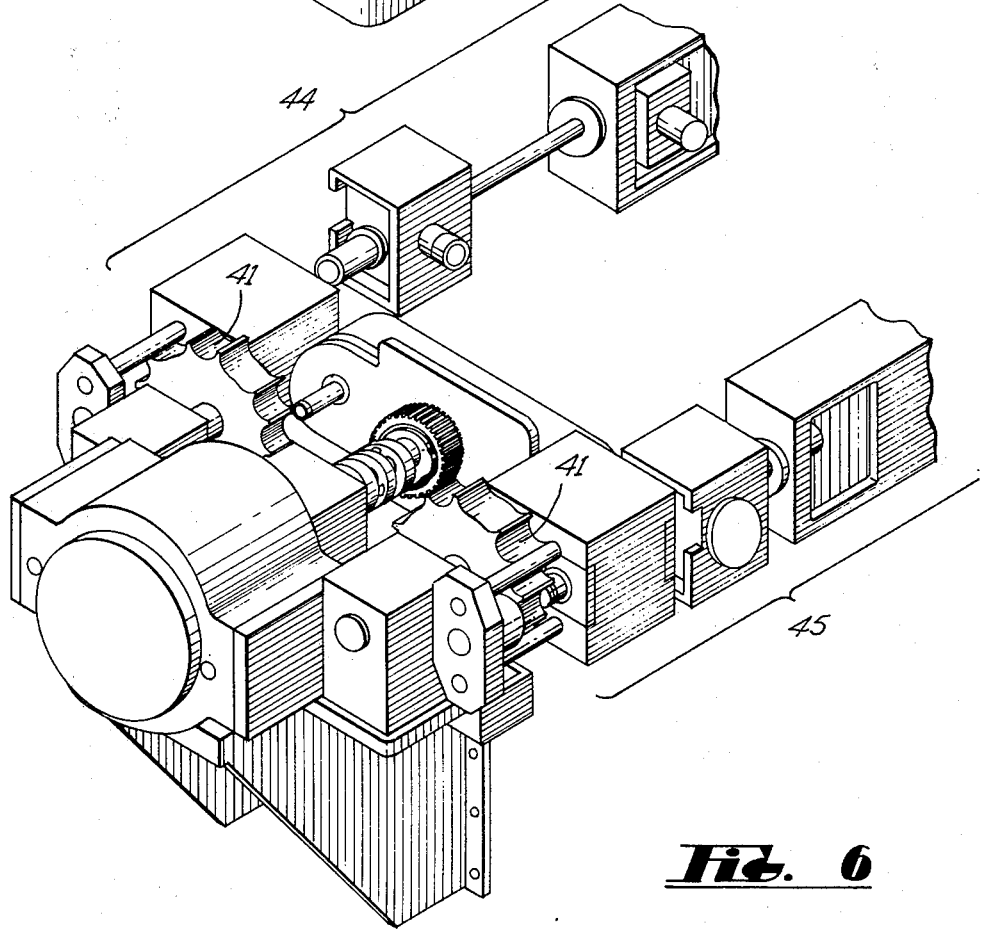
FIG. 6 is a view similar to FIG. 5 showing a 2-out trimming machine coupled directly to a 2-out body making machine.

FIG. 6 shows a similar 2-out version of the trimming machine of FIG. 5 coupled directly to a 2-out body making machine. The body making machines are generally and somewhat diagrammatically indicated at 44 and 45 and the cans produced by the body making machine are fed directly into the star wheels 41 of the 2-out trimmer. Thus, the star wheels 41 of the trimmer receive the can bodies directly from the ironing and doming punches of the body making machine and deliver them under positive control directly to the trimming mandrels, thereby avoiding the difficulties encountered in handling untrimmed cans at random in conventional track work as is currently being done.

The can body making machine may be as shown in the Hasselbeck et al. U.S. Pat. No. 3,702,559 dated Nov. 14, 1972.

It will be clear that numerous modifications may be made without departing from the spirit of the invention and therefore no limitation not expressly set forth in the claims is intended and no such limitation should be implied.

We claim:

1. A trimming machine for trimming drawn and wall-ironed cans to length, comprising
   a. a trimming mandrel mounted in a housing, and means to rotate said mandrel,
   b. feeding means for successively bringing cans to be trimmed into position in axial alignment with said mandrel,
   c. a loading plunger for pushing an aligned can onto said mandrel,
   d. means on said mandrel for gripping a can to cause it to rotate with said mandrel,
   e. an internal cutting blade mounted on said mandrel,
   f. an exterior cutting wheel and means to cause said cutting wheel to rotate at the same peripheral speed as said mandrel, and means for moving said cutting wheel into and out of engagement with a can on said mandrel,
   g. scrap cutters positioned beyond said cutting wheel and arranged to cooperate with stationary parting dies mounted on the mandrel housing,
   h. means for retracting said cutting wheel from contact with the can, i. means to cause said loading plunger to push said can to the point where the scrap overlies said parting dies,
j. means to actuate said scrap cutters to cut said scrap,
k. means to remove said cut scrap,
l. means to eject said trimmed can from scrap cutting position,
m. means to retract said loading plunger, and
n. means to cause said trimmed can to follow said retracting loading plunger to remove it from said mandrel, all of said means operating in timed relation from a common drive.

2. A machine according to claim 1, wherein the means on said mandrel for gripping a can comprise an expandable pneumatic clutch.

3. A machine according to claim 1, wherein the means for moving said cutting wheel into and out of engagement with a can on said mandrel comprises a cam actuated bell crank on which said cutting wheel is mounted.

4. A machine according to claim 1, wherein said loading plunger is cam actuated, and said cam is provided with three dwells, one in a retracted position for can loading, one with a can in position for trimming, and one with a can in position for scrap cutting.

5. A machine according to claim 1, wherein there are two reciprocable scrap cutters in diametrically opposed positions, and cam means are provided to actuate both cutters simultaneously.

6. A machine according to claim 1, wherein a compression spring is provided on the mandrel shaft, said spring being compressed by the loading plunger in pushing a can to scrap cutting position, said spring serving to eject the trimmed can from scrap cutting position, and air means to cause said trimmed can to follow the retracting loading plunger.

7. A machine according to claim 1 arranged side-by-side with a like machine, and common driving means for said two machines, and constituting a 2-out trimming machine for trimming drawn and wall-ironed cans being put out by two can body making machines.

8. A machine according to claim 7, in combination with a 2-out can body making machine, said machines being directly coupled, with the output of each body making machine feeding directly into the respective trimming machine.

* * * * *